Figure 1:
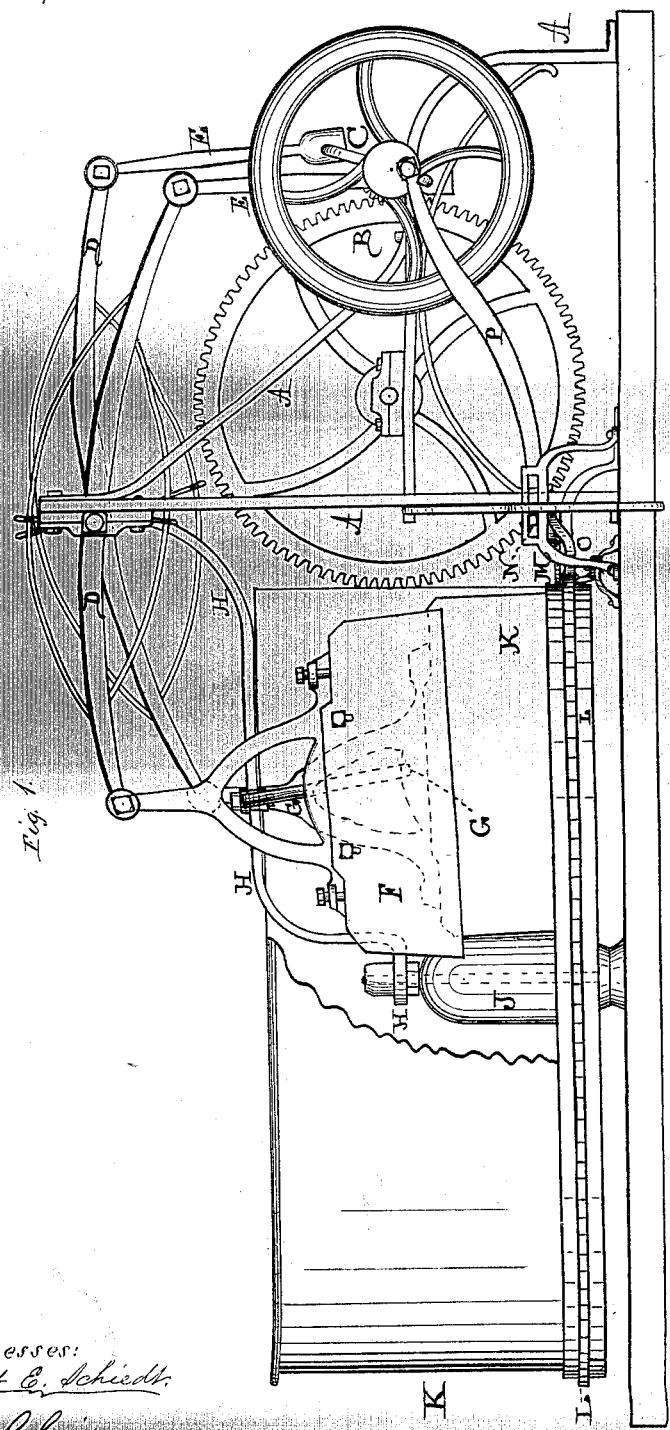

I. SIEGRIST.
Improvement in Meat Cutters.

No. 125,699. Patented April 16, 1872.

Witnesses:
Jacob E. Schiedt
Alfred C. Savidge

Inventor:
Isaac Siegrist
by John A. Wiedersheim 125,699

UNITED STATES PATENT OFFICE.

ISAAC SIEGRIST, OF STEINSBURG, PENNSYLVANIA.

IMPROVEMENT IN MEAT-CUTTERS.

Specification forming part of Letters Patent No. 125,699, dated April 16, 1872.

*To all whom it may concern:*

Be it known that I, ISAAC SIEGRIST, of Steinsburg, in the county of Bucks and State of Pennsylvania, have invented new and useful Improvements in Meat-Cutters; and I do hereby declare the following to be a clear and exact description of the nature thereof, sufficient to enable others skilled in the art to which my invention appertains to fully understand and use the same, reference being had to the accompanying drawing making a part of this specification, in which—

Figure 1 is a side view of the device illustrating my invention. Fig. 2 is a top or plan view thereof.

Similar letters of reference indicate corresponding parts in the several figures.

This invention relates to a cutter or mincer for meat and other articles. It consists of knives reciprocating with each other and hinged to different rocking beams operated by a double crank-shaft. It also consists of spring-pawls mounted on different ends of a lever and operating reciprocally on each half turn or revolution of the operating shaft. It finally consists in causing the knives to make the "draw" cut.

Referring to the drawing, A represents a frame-work which supports gearing B, a double crank-shaft C, and rocking beams D D. The beams D D are connected to the double crank-shaft C by pitmen E E, and receive their rocking motions through the medium of the gearing B, which operates the crank-shaft. To the ends of the beams opposite the pitmen E there are hinged the knives or cutters F, which cut alternately or reciprocally so that the article to be cut will be fully subjected to the cutting or mincing operation. In order to cause the knives to make the draw-cut said knives or their frames will move on oblique guides G, which are suspended from a brace, H, which preferably extends from the axis J of the pan or receiver K to the axis of the beams D. When the knives are operated, being hung by a hinge-joint from the beams, they follow the line of the guides and thus make the "draw" cut into the article in the pan and thus fully and easily perform their work. The pan or receiver K rotates on its axis J and has formed circumferentially serrations or teeth L, with which engage two pawls, M, which are respectively hinged at or near the opposite ends of a lever, N, and pressed against the teeth by the forward movements of the ends of the lever, respectively, and held thereon by springs O. The lever N is suitably mounted on the base or support of the apparatus and the springs properly located. To one side of the lever N is jointed a pitman or shaft, P, which is connected by a wrist-pin or crank to the end of the double crank-shaft C, so that by operating this shaft C the knives are reciprocated and the pan is rotated. When power is applied to the gearing or crank-shaft the knives alternately cut with a "draw" cut into the article in the pan K, so that the article is subjected to the action of the two knives and cannot pass around without being reached by the knives. When a knife ascends one pawl turns the pan, and as the other knife ascends the other pawl operates the pan. During this intermittent rotation of the pan, while one pawl is in operation the other pawl rides back over the teeth or serrations, this operation being performed on every half turn of the shaft C. It will be seen that while the knives operate rapidly and cut at different points, the pan receives a quick intermittent motion, whereby the article must necessarily be subjected to a thorough cutting process.

Having thus described my invention, what I claim as new, and desire to secure by Letters Patent, is—

1. The knives F, reciprocating with each other and hinged to different rocking beams D, which are operated on the ends opposite to the knives by a double crank-shaft, C, as described for the purpose specified.

2. The spring-pawls M, mounted on opposite ends of the lever N, operating reciprocally against the teeth of the pan K on each half turn of the operating shaft C, as set forth, for the purpose specified.

3. Imparting the "draw" cut to the knife or knives, by means of one or more oblique guides G, substantially as described.

To the above I have signed my name this 24th day of January, 1872.

ISAAC SIEGRIST.

Witnesses:
JOHN M. ZUCK,
JACOB HOFFEL.

2 Sheets--Sheet 1.
A. SNYDER.
Improvement in Construction of Barges.
No. 125,700. Patented April 16, 1872.
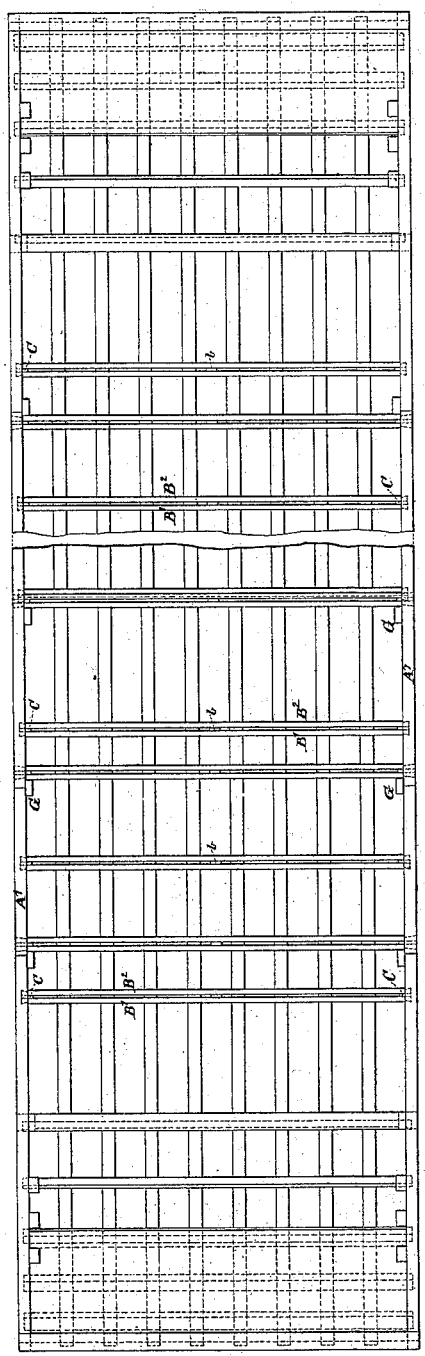
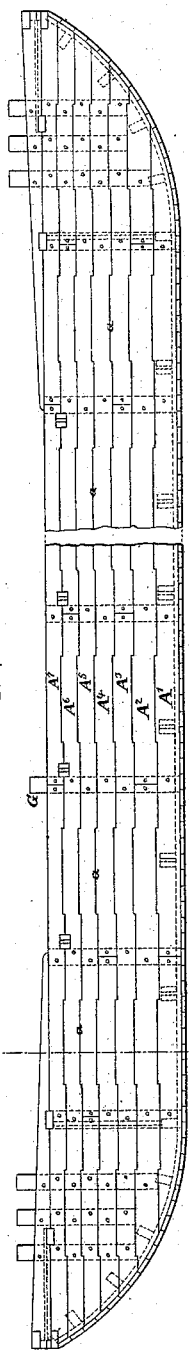
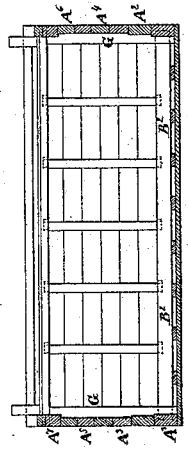
Witnesses,
Inventor,